Jan. 23, 1968  L. M. FRANCIS  3,365,034
ACCELERATOR POSITION CONTROL DEVICE FOR AUTOMOTIVE VEHICLES
Filed March 21, 1966  3 Sheets-Sheet 1
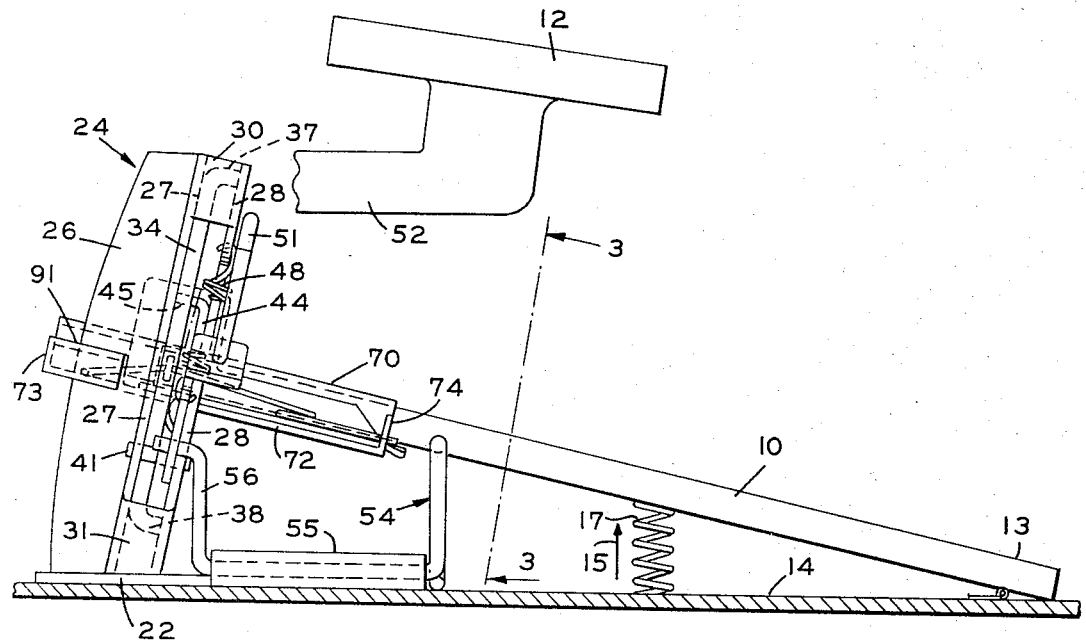
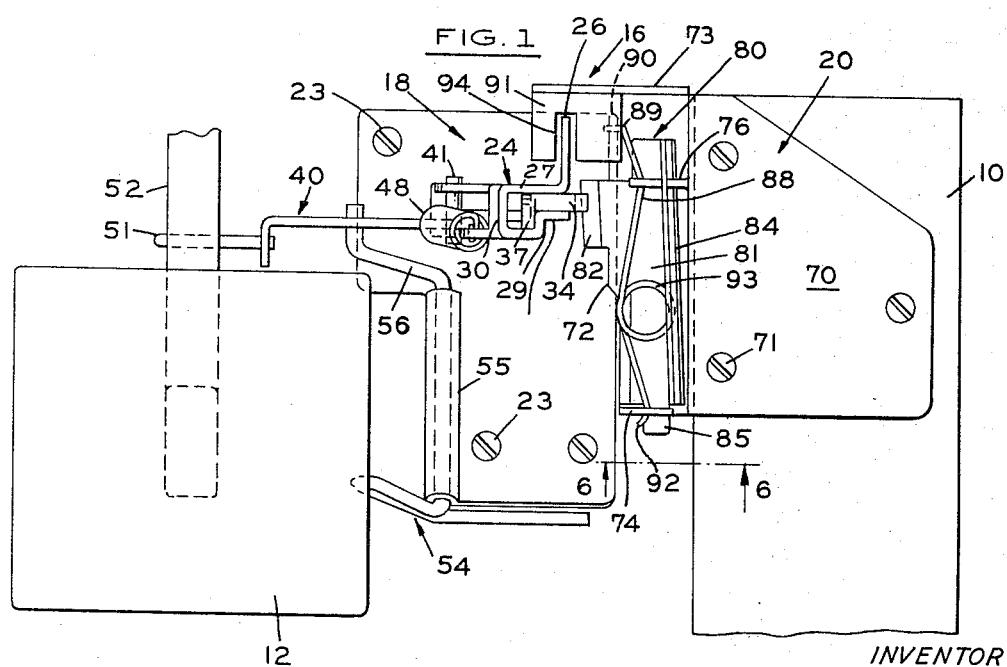
*INVENTOR*
LYNN M. FRANCIS
BY
Farley, Forster & Farley
*ATTORNEYS*

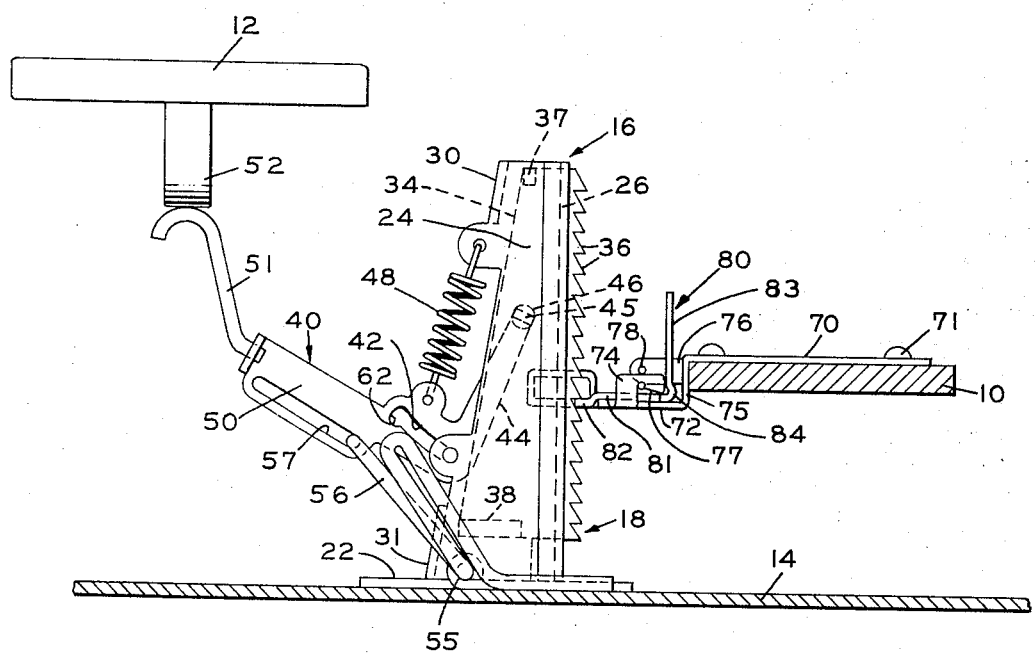

Jan. 23, 1968   L. M. FRANCIS   3,365,034
ACCELERATOR POSITION CONTROL DEVICE FOR AUTOMOTIVE VEHICLES
Filed March 21, 1966   3 Sheets-Sheet 3
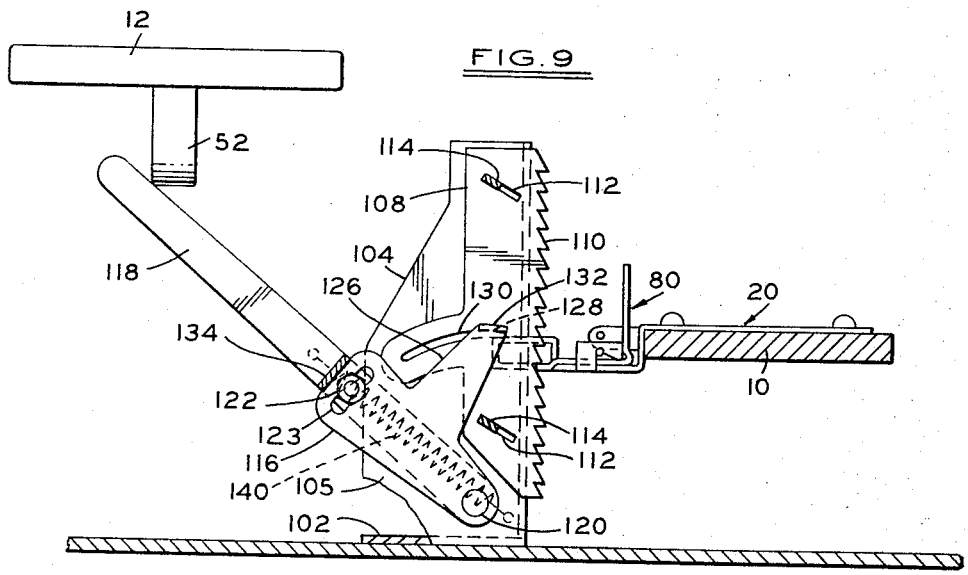
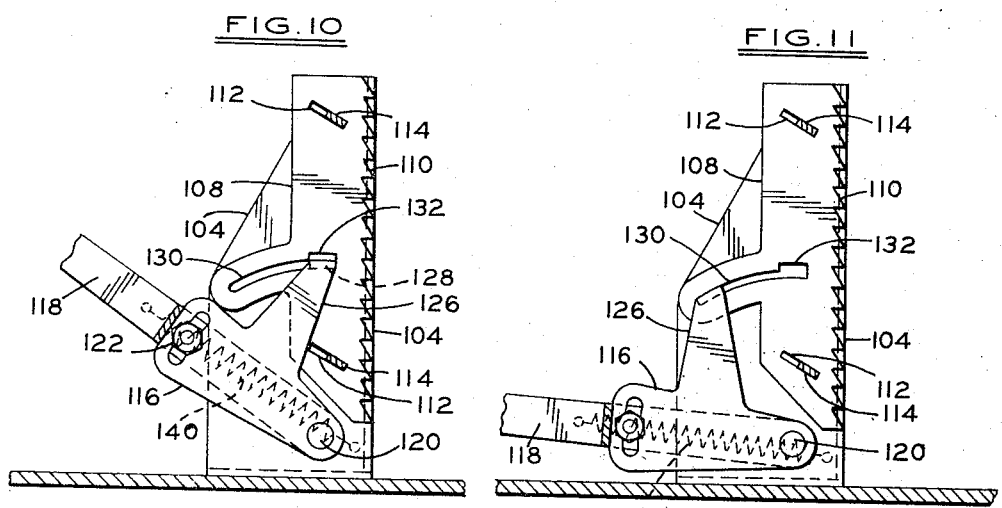
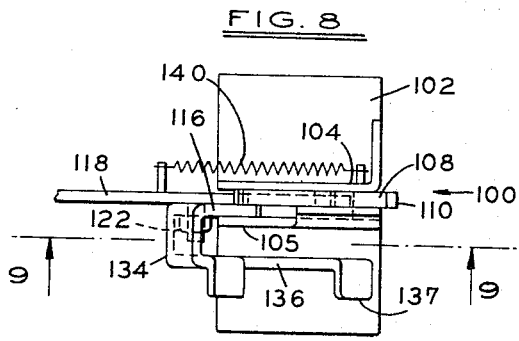
*INVENTOR*
LYNN M. FRANCIS
BY
Farley, Forster & Farley
*ATTORNEYS*

United States Patent Office 3,365,034
Patented Jan. 23, 1968

3,365,034
ACCELERATOR POSITION CONTROL DEVICE
FOR AUTOMOTIVE VEHICLES
Lynn M. Francis, St. Clair Shores, Mich., assignor of one-half to E. A. Skae, Grosse Pointe Farms, Mich.
Continuation-in-part of application Ser. No. 389,278, Aug. 13, 1964. This application Mar. 21, 1966, Ser. No. 543,468
19 Claims. (Cl. 192—3)

This invention relates to an improved device for holding the accelerator pedal of an automotive vehicle in a desired depressed position and the present application is a continuation-in-part of my prior application Ser. No. 389,278 filed Aug. 13, 1964, and now abandoned.

The overall object of the present invention is to provide a device of this type which for safety purposes is normally biased to an inoperative condition at all times; which can be rendered operative or inoperative at will of the driver by movement of the same foot which controls the position of the accelerator pedal; which is rendered inoperative if the brake is applied; which can be disabled at will and which is simple in construction and installation.

According to the invention, a selectively operable latch device for use with the accelerator and brake pedals of a vehicle for holding the accelerator pedal in a desired depressed position comprises a housing adapted to be mounted on the vehicle adjacent the accelerator pedal, a keeper member mounted on the housing for movement between operative and inoperative positions and having a series of teeth projecting toward the accelerator pedal, means normally urging the keeper member to operative position, a latch member mounted on the accelerator pedal for movement between inoperative and operative positions, means normally urging the latch member to inoperative position, foot operable means for moving the latch member to operative position for engagement with a tooth of the keeper member when the latter is in its operative position, and means for moving the keeper member to inoperative position in response to braking movement of the brake pedal.

Engagement between the latch member and a tooth of the keeper member is maintained by retaining means which preferably include force from the normal spring-urged return movement of the accelerator pedal and linkage; hence, when the device is being used to hold the accelerator depressed to a desired degree, downward pressure on the accelerator will reduce this force and result in normally urged movement of the latch member to inoperative position.

Movement of the keeper member to inoperative position preferably produces a positive disengagement of this member from the latch member.

The foregoing as well as other features and advantages of the invention will appear from the following description of the representative embodiment disclosed in the accompanying drawings in which:

FIGURE 1 is a plan view showing portions of the accelerator and brake pedals of a vehicle with the device of the invention installed thereon;

FIGURE 2 is a side elevation of the structure shown in FIG. 1;

FIGURE 3 is a sectional elevation taken substantially as indicated by the line 3—3 of FIG. 2;

FIGURE 4 is an elevation showing the keeper member of FIG. 3 in inoperative position;

FIGURE 5 is an elevation similar to FIG. 4 showing the keeper member in inactive position;

FIGURES 6 and 7 are fragmentary sectional elevations taken substantially as indicated by the line 6—6 of FIG. 1 and respectively showing releasing and fully released positions of the latch member;

FIGURE 8 is a plan view of a modified form of keeper assembly;

FIGURE 9 is a sectional elevation similar to FIG. 3 showing a modified form of device incorporating the keeper assembly of FIG. 8, this component in FIG. 9 being illustrated substantially as indicated by the line 9—9 of FIG. 8; and FIGURES 10 and 11 are sectional elevations showing the keeper assembly of FIGS. 8 and 9 in inoperative and inactive positions respectively.

FIGURES 1–3 illustrate a conventional arrangement of the accelerator pedal 10 and brake pedal 12 of an automotive vehicle, the accelerator pedal being pivotally mounted at its heel end 13 on the floor 14 of the vehicle and the brake pedal 12 being adjacent and to the left of the accelerator pedal as shown in FIGS. 1 and 3. In these views, the brake pedal 12 is in its normal released position; the accelerator pedal 10 is held in an intermediate depressed position by the device 16 of the invention, it being understood that the accelerator pedal 10 is normally urged in the conventional manner in the direction 15 to full released position by a spring or springs schematically indicated at 17.

The device of the invention consists of two principal components, a keeper assembly 18 mounted on the floor 14 adjacent the accelerator pedal 10 and intermediate the accelerator and brake pedals, and a latch assembly 20 mounted on the upper face of the accelerator pedal.

The keeper assembly 18 includes a base plate 22 mounted on the floor 14 by fasteners 23, and an upstanding housing 24 rigidly secured to the base plate 22. Housing 24 is shaped to provide a forwardly projecting guide flange 26, spaced side portions 27 and 28 forming a slot facing the accelerator pedal 10, the side portion 28 being offset at 29, and the side portions being interconnected by an upper transverse web 30 and a lower transverse web 31. A keeper member 34 having a series of teeth 36 is slidably mounted in the slotted portion of the housing with the teeth projecting toward the accelerator pedal 10, and lugs 37 and 38 at the top and bottom of the keeper member overlap the offset portion 29 of the housing to limit movement of the keeper member outwardly of the slot.

A bell-crank lever 40 is pivotally and slidably mounted on a pin 41 carried by the housing and extending through an arcuate slot 42 (FIG. 3) in the lever. The lever includes one arm 44 which extends into the housing alongside of the keeper 34 and is provided with a tang 45 which projects loosely through an aperture 46 in the keeper to establish a pivotal connection between this arm of the lever and the keeper. A tension spring 48 extends between the housing and the lever 40 and biases the lever in a clockwise direction as the parts are viewed in FIGS. 3–5 with the result that the keeper member 34 is normally urged to an operative position in which the teeth 36 project from the slotted portion of the housing, as shown in FIGS. 1 and 3. The other arm 50 of the lever is provided with an extension 51 which is adjusted to closely underlie the brake pedal arm 52 when the brake pedal is in released position and the lever is in normal operative position as shown in FIG. 3.

A disabling lever 54 is pivotally mounted in a sleeve 55 on the base plate 22 and includes an arm 56 which extends into engagement with an elongated slot 57 in the arm 50 of lever 40. The disabling lever 54 also includes a disabling arm 58 and a resetting arm 60, either of which can be contacted by the driver's foot to rock the lever 54 in either direction. When the disabling arm 58 is engaged and depressed, the lever rocks counterclockwise as the parts are shown in FIGS. 3–5, the lever 40 is also rocked counterclockwise by the arm 56 engaging the slot 57, and at the same time the slotted portion 42 of the lever 40 slides inwardly on the pin 41 until the pin engages a notch 62 at the end of the slot 42. This position is shown in FIG. 5. The keeper 34 has been retracted to an inoperative position within the housing; the arm 51 has been moved away from the brake pedal and the device is disabled.

The latch assembly 20 includes a base plate 70 secured to the upper face of the accelerator pedal 10 by fasteners 71.

This base plate is formed with a laterally projecting offset portion 72 joined to the upper portion of the plate by a vertical flange 75, with upstanding flanges 73 and 74 at the ends of the offset portion 72, and with an ear 76 punched out of the flange 75. A triangular aperture 77 is provided in the end flange 74 and a hole 78 is provided through the ear 76.

A latch member 80 is mounted on the offset portion 72 of the base plate for sliding and rocking movement between an operative position shown in FIGS. 2 and 3 and an inoperative position indicated in FIG. 7. The latch member is approximately L-shaped in end elevation and has a bottom portion 81 which rests on the offset portion 72 of the base plate and includes a projecting, offset ledge 82, forming a detent means, a vertical portion 83 with a rounded edge 84 between the portions 81 and 83, a tang 85 at one end of the bottom portion engaging the aperture 77 in the end flange 74 of the base plate, and a slotted opening in the vertical portion 83 through which the ear 76 extends.

The latch member is retained in assembled relation with the base plate and normally urged to inoperative position by a hairpin type of spring 88 (FIG. 1) which extends through the hole 78 in the ear 76 of the base plate, has one end 89 anchored in a socket 90 of a guide block 91 mounted on the base plate end flange 73, has the other end 92 engaged in the triangular aperture 77, and includes a loop portion 93 which projects into the notch formed by the rounded edge 84 of the latch plate.

The guide block 91 has a slot 94 which straddles the guide 26 on the housing, thus properly positioning the latch and keeper assemblies relative to each other.

In the normal spring-urged working position of the parts, the keeper member 34 is in the operative position with its teeth 36 extending from the housing 24 as shown in FIG. 3. The latch member 80 is in the inoperative position shown in FIG. 7 with its vertical portion 83 resting against the vertical flange 75 of the base plate 70 and with its offset ledge portion 82 in clearance relation with the teeth 36 of the keeper member, permitting free depressing and releasing movement of the accelerator pedal 10 in the ordinary way. If the operator desires to have the accelerator pedal 10 held in a depressed position, the vertical portion 83 of the latch member is engaged with a slight sidewards movement of the foot to produce a combined pivotal and rocking movement of the latch member, permitted by the mounting of the latch member tang portion 85 in the triangular aperture 77. The latch member is moved sideways or transversely of the path of accelerator pedal travel to engage its offset ledge 82 in one of the teeth 36 of the keeper member, and then a slight releasing movement of the accelerator pedal 10 causes the latch member to rock downwardly to place the detent means formed by the offset ledge portion 82 thereof into engagement with the edge of the portion 72 of the base plate in the position shown in FIG. 3. Further rocking movement of the latch member is limited by the ear 76 of the base plate, and the latch member is retained in this operative position by the normal spring return force on the accelerator pedal 10.

If a condition should arise requiring the brake pedal 12 to be applied, braking movement thereof will be accompanied by a counterclockwise pivotal movement of the lever 40, as the parts are viewed in FIGS. 3 and 4, causing the keeper member 34 to be retracted into the housing 24 as shown in the latter view and resulting in the positive disengagement of any tooth 36 from the latch member. Hence the accelerator is released as the brake is applied.

When application of the brake is not required when the accelerator is held in a depressed position by the device, the accelerator can be released by a slight initial depressing movement. This results in the latch member 80 rocking to a position such as shown in FIG. 6 where the projecting ledge 82 thereof no longer overlaps the edge of the portion 72 and the latch member is at once returned to the inoperative FIG. 7 position by action of the spring 88. The device is self-releasing in the sense that no action is required of the operator other than placing the foot back on the accelerator pedal.

Operation of the disabling lever 54 has been previously explained. When the device has been disabled it is impossible to engage the latch member with the keeper. Normal operation can be easily restored by applying a slight downward force to the resetting arm 60, just enough to move the pin 41 out of engagement with the notch 62 of the slot 42. The parts will then be returned to normal working position by action of the spring 48.

The construction shown in FIGS. 8–11 employs a modified form of keeper assembly which may be used with the same latch assembly 20 on the accelerator pedal. In these views parts which are identical to those of the first form of construction have been identified by the same reference numerals.

This keeper assembly 100 includes a base portion 102 mounted on the floor 14 of the vehicle. A pair of upstanding side plates 104 and 105, formed integrally with or secured to the base portion 102, form the sides of a housing in which a keeper member 108 is mounted, the keeper member having a series of teeth 110. A pair of downwardly inclined slots 112 in the keeper member 108 engage a pair of lugs 114 formed with or secured to at least one of the side plates 104 or 105, which lugs may also be employed to connect the two side plates 104 and 105 together. This provides, in effect, a slot and pin mounting of the keeper on the housing, the keeper being freely movable on the lugs 114 so as to normally tend to move downwardly and outwardly of the housing to an operative position defined by the slot and pin type of connection, in which position the teeth 110 of the keeper project toward the accelerator pedal 10 for selective engagement by the latch member 80 mounted thereon.

A bell-crank lever 116 and brake pedal engaging arm 118 are both mounted on a pivot 120 carried by the housing side plates and are secured together by a bolt 122 engaging a slot 123 in the bell-crank lever 116 so that the arm 118 may be properly positioned relative to the brake pedal arm 52.

The bell-crank lever 116 includes an upwardly extending arm 126 having an inturned lug 128 which engages an arcuate slot 130 in the keeper 108, this slot being formed with a notch 132 at one end, and when the keeper member 108 is assembled in the housing, the slot 130 extends about the center of the pivot 120. Referring to FIG. 8, the bell-crank lever 116 is generally U-shaped as shown in this plan view, including a base portion 134 and a leg 136 provided with a toe piece 137 engageable by the driver's foot. A spring 140 is mounted between the arm 118 and housing plate 104 in overcenter relation to the pivot 120 so as to normally urge the arm 118 and bell-crank 116 to the upper position shown in FIGS. 9 and 10, or retain them in the lower position shown in FIG. 11.

In the normal operative position of the parts shown in FIG. 9, the teeth 110 of the keeper member 108 are engageable by the latch 80 on the accelerator to hold the latter in any position desired in the manner previously described. When the accelerator is so held in a depressed position and the brake 12 is applied, the resulting pivotal movement of the arm 118 and bell-crank 116 about a pivot 120 will initially, through engagement of the bell-crank lug 128 in the keeper member notch 132 and the slot and pin mounting of the keeper, produce inward and upward movement of the keeper to the position shown in FIG. 10, with further downward movement of the brake pedal merely resulting in free movement of the bell-crank lug 128 in the arcuate portion of the slot 130 in the keeper. This inward and upward movement of the keeper causes positive disengagement of the keeper from the accelerator pedal latch 80.

The device can be disabled by merely applying pressure to the toe piece 137 of the bell-crank lever 116 to produce pivotal movement of the bell-crank lever and arm 118 to the position shown in FIG. 11 in which the keeper 108 is in the inoperative position, being retracted within the housing plates 104 and 105.

An improved relation between the brake pedal arm 52 and arm 118 of the keeper assembly results from the construction of FIGS. 8–11 in the sense that the brake pedal engaging arm 118 moves about the fixed pivot 120. Additionally, the construction of the keeper assembly is simplified and yet equally positive in operation.

While the constructions described provides a relatively simple, inexpensive device for reducing driver fatigue during open highway travel, they are representative of the present invention, and changes and modifications within the scope of the following claims are to be considered a part thereof.

I claim:

1. A selectively operable latch device for use with the accelerator and brake pedals of a vehicle for holding the accelerator pedal in a desired depressed position comprising:
    (a) a housing adapted to be mounted adjacent the accelerator pedal,
    (b) a keeper member having a series of teeth thereon,
    (c) means mounting the keeper member on the housing for movement between operative and inoperative positions,
    (d) means normally urging the keeper member to operative position,
    (e) a latch member,
    (f) means mounting the latch member on the accelerator pedal for movement between inoperative and operative positions,
    (g) means normally urging the latch member to inoperative position,
    (h) foot operable means for moving the latch member to operative position for engagement with a tooth of the keeper member when the latter is in its operative position, and
    (i) means for moving the keeper member to inoperative position in response to braking movement of the brake pedal.

2. A device as claimed in claim 1 further comprising retaining means for holding the latch member in operative position when engaged with a tooth of the keeper member.

3. A device as claimed in claim 2 wherein said retaining means comprises detent means on the latch member engaged in retaining position in response to normally urged return movement of the accelerator pedal.

4. A device as claimed in claim 1 wherein the means mounting the latch member on the accelerator pedal includes a plate secured to the accelerator pedal and having a laterally projecting portion extending toward the housing, means connecting the latch member to the laterally projecting portion of the plate for movement of the latch member on the upper surface of the plate transversely to the path of travel of the accelerator pedal and for rocking movement of the latch member in a direction normal to the upper surface of the plate, and retaining means engageable in response to said rocking movement of the latch member for holding the latch member in operative position when engaged with one of the series of teeth on the keeper member.

5. A device as claimed in claim 4 wherein the retaining means includes detent means between the latch member and plate.

6. A device as claimed in claim 1 further comprising a guide surface provided on the housing and extending parallel to the direction of accelerator pedal movement, and a guide member mounted on the accelerator pedal and slidably engaging said guide surface.

7. A device as claimed in claim 1 wherein the means mounting the keeper member on the housing for movement between operative and inoperative positions define an inoperative position in which the teeth of the keeper member are retracted within the housing.

8. A device as claimed in claim 1 wherein the housing includes at least one upstanding side plate, and the means mounting the keeper member on the housing includes a pin and slot connection between the keeper member and said side plate.

9. A device as claimed in claim 8 wherein the pin and slot connection defines a path of movement of the keeper member which includes a component in the general direction of accelerator movement.

10. A device as claimed in claim 1 wherein the means for moving the keeper member to inoperative position in response to braking movement of the brake pedal includes a lever pivotally carried by the housing.

11. A device as claimed in claim 10 wherein the lever has one arm engaging the keeper member, a second arm extending into the path of movement of the brake pedal, and means for adjusting the relative position of the first and second arms.

12. A device as claimed in claim 10 wherein the keeper member includes a slot in arcuate relation to the pivotal axis of said lever, said slot having a notched portion therein, said lever including an arm engaging the slot; and the means mounting the keeper member on the housing providing relative movement between the keeper member and lever for disengagement of the lever arm from the notched portion of the keeper member slot in response to movement of the keeper member to inoperative position.

13. A device as claimed in claim 1 wherein the means for moving the keeper member to inoperative position includes a lever pivotally carried by the housing, and pin and slot connecting means between the lever and keeper member for moving the keeper member to inoperative position in response to initial movement of the lever and for overtravel of the lever in response to further braking movement of the brake pedal.

14. A device as claimed in claim 1 further comprising disabling means for moving said keeper member to inoperative position and retaining it therein.

15. A selectively operable latch device for use with the accelerator and brake pedals of a vehicle for holding the accelerator pedal in a desired depressed position comprising:
    (a) a keeper assembly including a housing having a base adapted to be secured to the vehicle floor adjacent and to one side of the path of travel of the accelerator pedal;
    (b) a keeper member having a series of teeth along one edge thereof movably carried by the housing;
    (c) operating means including one arm engaging said keeper member and a second arm extending into the path of braking movement of the brake pedal;
    (d) a latch assembly including a latch member and means mounting the latch member on the accelerator pedal for movement between inoperative and operative positions;
    (e) spring means normally urging the latch member to the inoperative position;
    (f) accelerator foot operable means for selectively moving the latch member to the operative position in which the latch member is engageable with one of the series of teeth of the keeper member;

(g) retaining means for holding the latch member in the operative position in response to such engagement; and (h) spring means normally retaining the operating means and keeper member in a position in which at least one of the series of teeth is engageable by the latch member on the accelerator pedal, said keeper member being moved to an inoperative position by the operating means in response to braking movement of the brake pedal.

16. A device as claimed in claim 15 further comprising disabling means for retaining the keeper member in an inoperative position with the second arm of the operating means out of the path of movement of the brake pedal.

17. A device as claimed in claim 16 wherein said disabling means includes a disabling arm operatively associated with said operating means, and foot operable means for moving the disabling arm.

18. A device as claimed in claim 15 wherein the operating means is pivotally secured to the housing and includes a first lever having said one arm engaging the keeper member, said second arm being adjustably secured to the lever.

19. A device as claimed in claim 18 wherein said return spring is mounted between the housing and operating means in overcenter relation to the operating means pivot, said operating means being movable to a disabled position in which the second arm thereof is out of the path of movement of the brake pedal and in which disabled position the operating means is retained by said return spring.

References Cited

UNITED STATES PATENTS

| 2,568,481 | 9/1951 | Bianca | 192—3 |
| 2,677,445 | 5/1954 | Wentzel | 192—3 |
| 2,844,235 | 7/1958 | O'Connor | 192—3 |

BENJAMIN W. WYCHE III, *Primary Examiner.*